United States Patent

Gaddis et al.

[19]

[11] Patent Number: 6,017,039
[45] Date of Patent: Jan. 25, 2000

[54] NOSEPIECE NUT RETAINER CHUCK

[75] Inventors: Benjamin A. Gaddis; Kevin C. Miles, both of Clemson, S.C.

[73] Assignee: Power Tool Holders Incorporated, Wilmington, Del.

[21] Appl. No.: 08/962,789

[22] Filed: Nov. 3, 1997

[51] Int. Cl.[7] .................................................. B23B 31/12
[52] U.S. Cl. ............................................ 279/62; 279/902
[58] Field of Search ................................ 279/60–65, 902

[56] References Cited

U.S. PATENT DOCUMENTS

| | | | |
|---|---|---|---|
| 573,189 | 12/1896 | Vogel | 279/62 |
| 872,841 | 12/1907 | North | 279/62 |
| 896,051 | 8/1908 | Ashley | 279/62 |
| 897,335 | 9/1908 | Almond . | |
| 911,012 | 1/1909 | Jacobs . | |
| 1,053,530 | 12/1913 | North | 279/62 |
| 1,123,541 | 1/1915 | Jacobs . | |
| 1,417,981 | 5/1922 | Englund . | |
| 1,526,328 | 2/1925 | Englund . | |
| 2,292,470 | 8/1942 | Ostberg . | |
| 2,684,856 | 7/1954 | Stoner . | |
| 3,589,486 | 6/1971 | Kelch . | |
| 3,813,827 | 6/1974 | Bloch . | |
| 3,927,892 | 12/1975 | Pradota . | |
| 4,252,333 | 2/1981 | Vogel . | |
| 4,275,893 | 6/1981 | Bilanceri . | |
| 4,305,597 | 12/1981 | McCarty . | |
| 4,423,881 | 1/1984 | Whitehead . | |
| 4,460,296 | 7/1984 | Svertson, Jr. . | |
| 4,575,108 | 3/1986 | Whitehead . | |
| 4,648,608 | 3/1987 | Smith . | |
| 4,660,841 | 4/1987 | Chouinard . | |
| 4,664,394 | 5/1987 | Theissig et al. . | |
| 4,682,918 | 7/1987 | Palm . | |
| 4,695,065 | 9/1987 | Komatsu et al. . | |
| 4,702,122 | 10/1987 | Richard . | |
| 4,817,971 | 4/1989 | Flynn . | |
| 4,840,387 | 6/1989 | McCarthy . | |
| 4,842,288 | 6/1989 | Ando . | |
| 4,951,955 | 8/1990 | Sakamaki . | |
| 5,009,439 | 4/1991 | Sakamaki . | |
| 5,125,673 | 6/1992 | Huff et al. . | |
| 5,135,241 | 8/1992 | Huff et al. . | |
| 5,145,194 | 9/1992 | Huff et al. . | |
| 5,183,274 | 2/1993 | Sakamaki . | |
| 5,193,824 | 3/1993 | Salpaka . | |
| 5,215,317 | 6/1993 | Jordan et al. . | |
| 5,253,879 | 10/1993 | Huff et al. . | |
| 5,348,317 | 9/1994 | Steadings et al. . | |
| 5,348,318 | 9/1994 | Steadings et al. . | |
| 5,411,275 | 5/1995 | Huff et al. . | |
| 5,499,828 | 3/1996 | Salpaka et al. . | |
| 5,501,473 | 3/1996 | Barton et al. | 279/62 |
| 5,531,461 | 7/1996 | Huff et al. . | |
| 5,553,873 | 9/1996 | Salpaka et al. . | |

FOREIGN PATENT DOCUMENTS

| | | |
|---|---|---|
| 0340310A1 | 11/1989 | European Pat. Off. . |
| 0433187A1 | 6/1991 | European Pat. Off. . |
| 3439668A1 | 4/1986 | Germany . |
| 4023304C1 | 9/1991 | Germany . |
| 63-216604 | 9/1988 | Japan . |
| B23B31 04 | 10/1988 | Japan . |
| 661643 | 11/1951 | United Kingdom . |

OTHER PUBLICATIONS 2 pages from catalogue entitled "SDS Rotary Hammers", no date.

4 pages from Yukiwa catalogue entitled "Products", in Japanese.

*Primary Examiner*—Steven C. Bishop
*Attorney, Agent, or Firm*—Dority & Manning, P.A.

[57] ABSTRACT

Chuck for use with manual or powered driver having rotatable shaft, the chuck including a nosepiece configured to maintain a nut member in engagement with threads on jaws that are actuated by a nut and sleeve arrangement.

23 Claims, 2 Drawing Sheets

NOSEPIECE NUT RETAINER CHUCK

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In one form of chuck, three jaws spaced circumferentially approximately 120 degrees apart from each other are constrained by angularly disposed passageways in a body attached onto the drive shaft and configured so that rotation of the body in one direction with respect to a constrained nut engaging the jaws forces the jaws into gripping relationship with the cylindrical shank of a tool, while rotation in the opposite direction releases the gripping relationship. Such a chuck may be keyless if it is rotated by hand. Examples of such chucks are disclosed in U.S. Pat. No. 5,125,673 entitled "Non-Impact Keyless Chuck" and in U.S. Pat. No. 5,501,473 entitled "Chuck", both commonly assigned to the present assignee, and whose entire disclosure is incorporated by reference herein.

Despite the success of keyless chucks such as set forth in U.S. Pat. Nos. 5,125,673 and 5,501,473, varying configurations of keyless chucks are desirable for a variety of applications.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a keyless chuck that allows for efficient tightening of the nut on the jaws during operation.

It is another object of the present invention to provide a keyless chuck that has a minimum number of individual components that must be assembled.

These and other objects are achieved by providing a chuck for use with a manual or power driver having a rotatable drive shaft, the chuck comprising a generally cylindrical body member having a nose section and a tail section. The tail section is adapted to mate with the drive shaft of the driver, and the nose section has an axial bore formed therein and a plurality of angularly disposed passageways formed therethrough and intersecting the axial bore. The chuck further includes a plurality of jaws slidably positioned in each of the angularly disposed passageways, each of the jaws having a jaw face formed on one side thereof and threads formed on the opposite side thereof. The chuck also includes a nut rotatably mounted on the body and in engagement with the threads on the jaws, and a nosepiece received on the nose section of the body. The nosepiece includes a nut contact portion to prevent movement of the nut toward the nose section of the body. The nut contact portion is configured with respect to the angularly disposed passageways in the body member so as not to interfere with the jaws positioned therein. The chuck further includes a sleeve member in driving engagement with the nut and overlying the nose section of the body member whereby when the sleeve member is rotated with respect to the body member, the jaws will be moved thereby.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
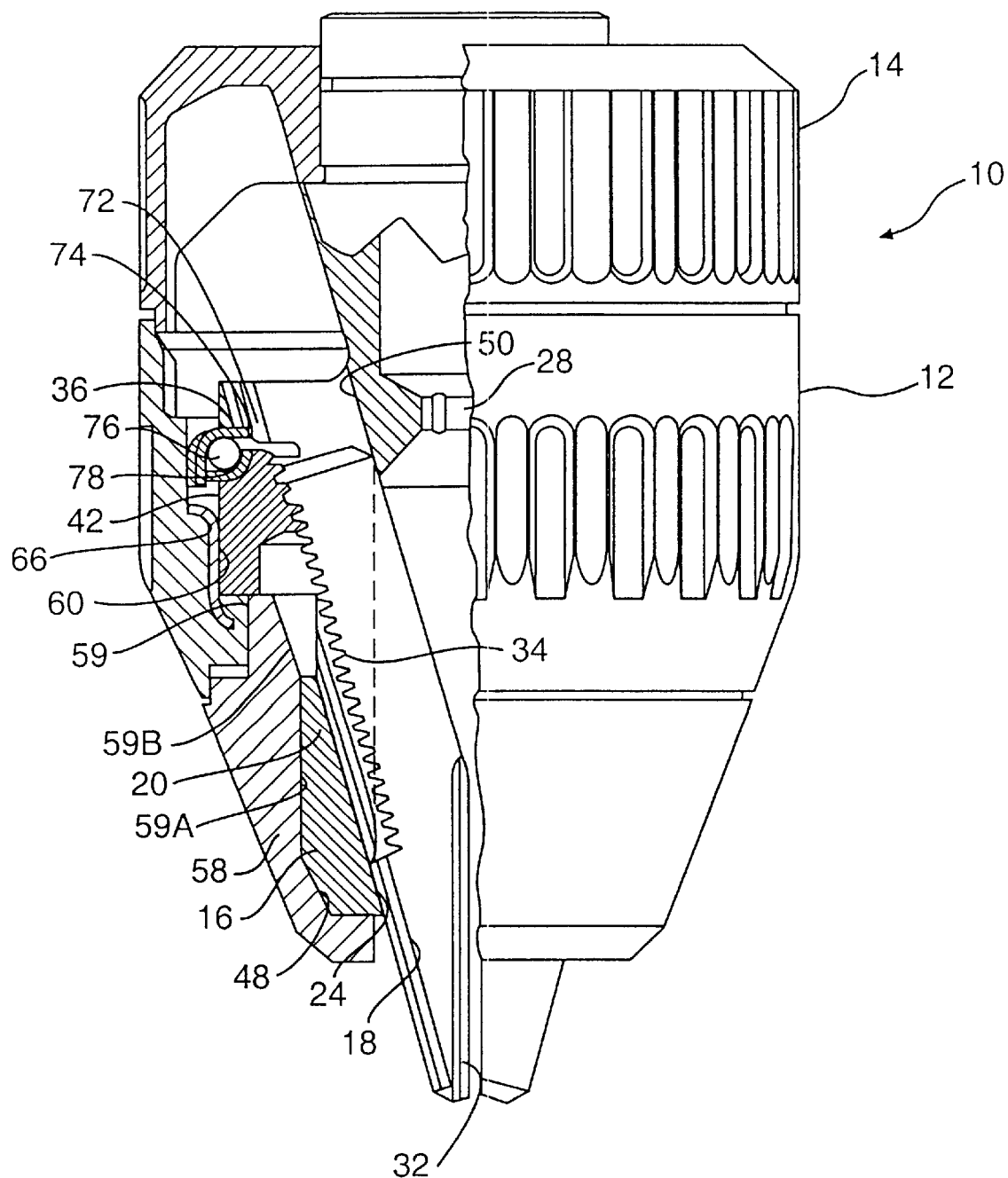
FIG. 1 is a longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
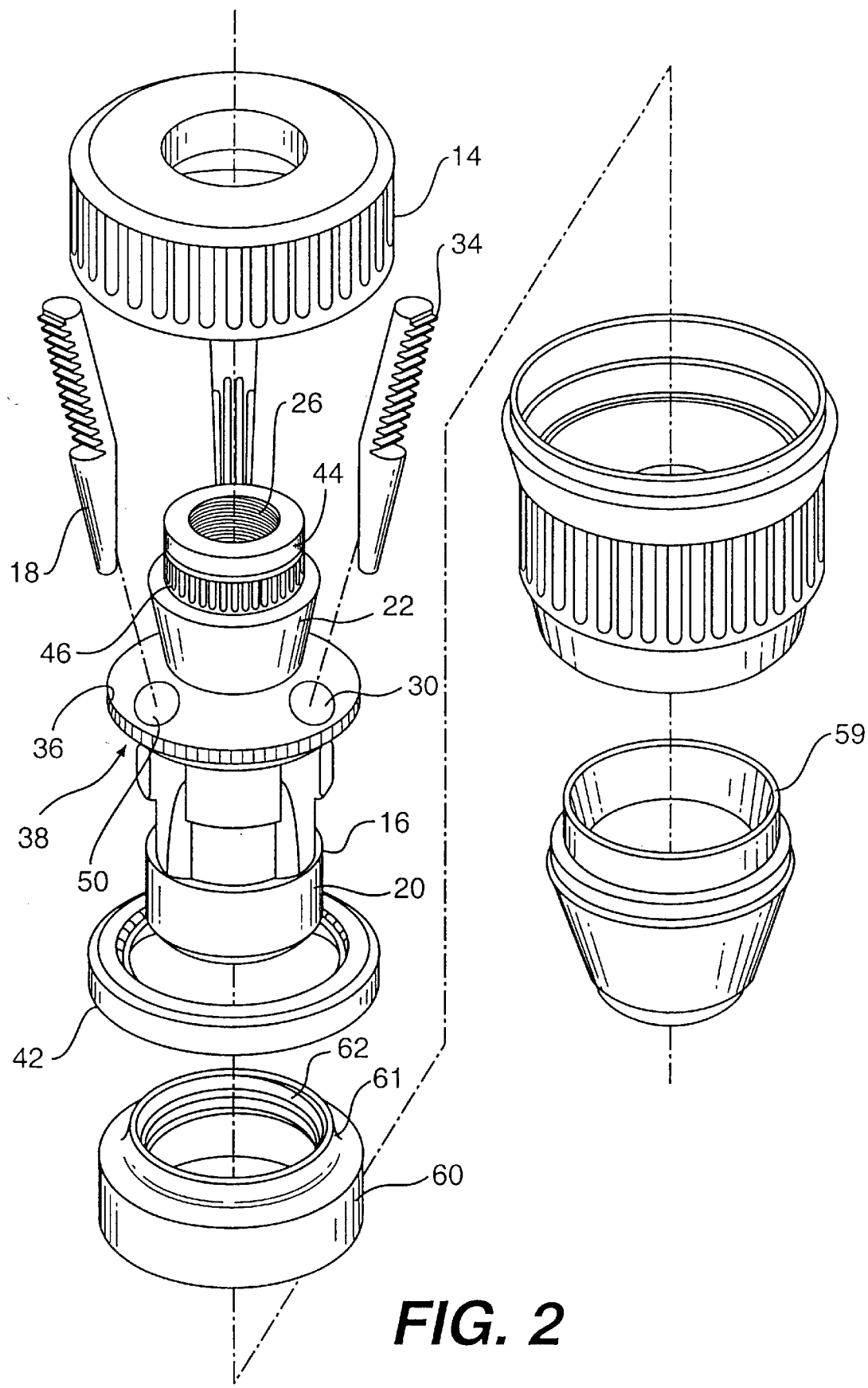
FIG. 2 is an exploded view of the chuck of FIG. 1.

Referring to FIG. 1, a chuck 10 in accordance with the present invention is illustrated. Chuck 10 includes a front sleeve member 12, an optional rear sleeve member 14, a body member 16 and jaws 18. Referring to FIGS. 1 and 2, body member 16 is generally cylindrical in shape and comprises a nose or forward section 20 and a tail or rearward section 22. An axial bore 24 is formed in the nose section 20 of the body member 16. Axial bore 24 is somewhat larger than the largest tool shank that the chuck is designed to accommodate. A threaded bore 26 is formed in tail section 22 of body 16 and is of a standard size to mate with the drive shaft of a powered or hand driver (not shown). The bores 24, 26 may communicate at the central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Referring to FIG. 1, three jaws 18 are employed and each jaw 18 is separated from the adjacent jaw by an arc of approximately 120 degrees. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of the chuck body 16 and threads 34 on its opposite or outer surface. Threads 34 of any suitable type and pitch may be utilized within the scope of the present invention as would be readily apparent to one skilled in the art.

As illustrated in FIGS. 1 and 2, body member 16 may include a thrust ring member 36 which, in a preferred embodiment, is integral therewith. It should be appreciated that thrust ring member 36 could be a separate component from the body member. Thrust ring member 36 includes a ledge portion 38. Ledge portion 38 is adapted for engagement with the shroud or outer race of a self-contained anti-friction bearing assembly 42 as will be described in more detail below. Thrust ring member 36 includes a plurality of jaw guideways 50 formed around the circumference to permit retraction of the jaws 18 therethrough. While a self-contained bearing is illustrated herein, it should be appreciated that any bearing or bearing surface would be within the scope of the present invention.

Referring to FIG. 2, body member 16 includes a rear cylindrical portion 44 with a knurled surface 46 thereon for receipt of optional rear sleeve 14 to be pressed thereon if so desired. A nose portion 48 is adapted to receive a nosepiece 58 as will be set forth in more detail below.

The present invention further includes a nut 60 which, in a preferred embodiment, is a one piece nut and which includes threads 62 for mating with threads 34 on jaws 18 whereby when nut 60 is rotated with respect to body 16, the jaws will be advanced or retracted. Nut 60 may include drive slots (not shown) for mating with drive ribs (not shown) on front sleeve 12 so that when front sleeve 12 is rotated, nut 60 will rotate therewith and move jaws 18 as set forth above. Alternately, and as illustrated, sleeve 12 may be press fitted to nut 60 so as to be rotationally and axially fixed thereto. Sleeve 12 may include a metallic member co-molded 66 therewith that forms the actual interface between sleeve 12 and nut 60. While this is the preferred embodiment, it should be appreciated that the metallic co-molded member could be eliminated and the sleeve designed in any known manner.

Nut 60 may further include an arcuate seating surface 61 for mating with an arcuate seating portion on the bearing assembly 42.

Referring to FIGS. 1 and 2, a self-contained bearing assembly 42 is adapted to be placed between thrust ring 36 and seating surface 61 of nut 60. Self-contained bearing assembly 42 includes an inner race 72, an outer race 74, and bearing elements 76 maintained therebetween. In a preferred embodiment, bearing elements 76 are ball bearings. Self-contained bearing assembly 42 may further include a shroud 78 surrounding the inner and outer races 72, 74 for maintaining the bearing assembly as a self-contained component. As set forth above, while a self-contained bearing assembly is illustrated, any bearing, or no bearing at all, would be within the scope of the present invention.

In a preferred embodiment as set forth above, front sleeve member 12 is press fitted to nut 60. A nosepiece 58 is dimensioned and adapted to be pressed onto nose portion 56 to maintain nut 60 in place on chuck 10. It should be appreciated that nosepiece 58 could also be secured to body 16 by snap fitting, threading or the like. Nosepiece 58 is exposed when the chuck is assembled and, in one embodiment, may be coated with a non-ferrous metallic coating to prevent rust and to enhance its appearance. Examples of suitable coatings include zinc or nickel, however, it should be appreciated that any suitable coating could be utilized.

Nosepiece 58 serves to maintain nut 60 in position on chuck 10 and in threaded engagement with the threads on the jaws 18.

Nosepiece 58 includes a nut contact portion 59 to prevent movement of nut 60 toward the nose section of the body. Nut contact portion 59 is configured with respect to passageways 30 in body member 16 so as not to interfere with movement of the jaws 18 therein. In a preferred embodiment, nosepiece 58 includes a portion with a cylindrical inner diameter 59A and a portion with a frustoconical inner diameter 59B. Nosepiece 58 may also be configured so that if sleeve 12 disengaged nut 60, it would be prevented from coming off the chuck by nosepiece 58.

In addition, nosepiece 58 serves the dual purpose of providing an aesthetically pleasing cover for nose portion 56 that will resist rust. This provides the advantage of an aesthetically pleasing appearance without the necessity to coat the entire body member 16. If desired, the rear sleeve member 14 may be omitted and the front sleeve member 12 extended to the tail end of body 16. This alternative is feasible when a spindle lock or the like is provided on the driver or when the driver is used to tighten or loosen the jaws.

The circumferential surface of the front sleeve member 12 may be knurled or may be provided with longitudinal ribs or other protrusions to enable the operator to grip it securely. In like manner, the circumferential surface of the rear sleeve member 14, if employed, may be knurled or ribbed if desired. The front and rear sleeves may be fabricated from a structural plastic such as polycarbonate, a filled polypropylene, for example, glass filled polypropylene, or a blend of structural plastic materials. Other composite materials such as, for example, graphite filled polymerics would also be suitable in certain environments. As will be appreciated by one skilled in the art, the materials from which the chuck of the present invention is fabricated will depend on the end use of the chuck, and the above are provided by way of example only.

It will be appreciated that rear sleeve member 14 is fixed to body member 16 while front sleeve member 12 is operatively associated with nut 36 and secured to body member 16 for relative rotation therewith. Relative movement of the front and rear sleeve members, 12 and 14, due to the interaction between threads 34 on jaws 18 and threads 62 on nut 60 causes jaws 18 to be advanced or retracted, depending upon the direction of relative movement.

While the above description is set forth with respect to a keyless chuck, it should be appreciated that the principles of the present invention are equally applicable to a keyed chuck, and such is within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;
   b) a plurality of jaws slidably positioned in each of said angularly disposed passageways, each of said jaws having a jaw face formed on one side thereof and threads formed on the opposite side thereof;
   c) a nut rotatably mounted with respect to said body member and in engagement with said threads on said jaws;

d) a nosepiece received on the nose section of said body, said nosepiece including a nut contact portion to assist in preventing said nut from disengaging the threads on said jaws, said nut contact portion being configured with respect to the angularly disposed passageways in said body member so as not to interfere with the jaws positioned therein, said nosepiece including a radially inwardly extending portion extending over at least a portion of the forwardmost section of said nose section; and e) a sleeve member in driving engagement with said nut whereby when said sleeve member is rotated with respect to said body member, said jaws will be moved thereby.

2. A chuck for use with a manual or powered driver as stated in claim 1, and further including a bearing thrust ring on said body.

3. A chuck for use with a manual or powered driver as stated in claim 2, and further including a bearing assembly disposed adjacent said thrust ring.

4. A chuck for use with a manual or powered driver as stated in claim 3, wherein said bearing assembly is a self-contained anti-friction bearing.

5. A chuck for use with a manual or powered driver as stated in claim 1, wherein said nosepiece is press fitted on said body member.

6. A chuck for use with a manual or powered driver as stated in claim 1, wherein said nosepiece includes a substantially cylindrical portion and a frustoconical portion extending therefrom.

7. A chuck for use with a manual or powered driver as stated in claim 1, wherein said nosepiece is rust resistant.

8. A chuck for use with a manual or powered driver as stated in claim 1, and further including a second sleeve secured to said tail section of said body member.

9. A chuck for use with a manual or powered driver having a rotatable drive shaft, said chuck comprising:

a) a generally cylindrical body member having a nose section and a tail section, said tail section adapted to mate with said drive shaft of said driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof and threads formed on the opposite side thereof;

c) a nut rotatably mounted with respect to said body member and in engagement with said threads on said jaws;

d) a nosepiece received on the nose section of said body, said nosepiece including a nut contact portion to assist in preventing said nut from disengaging the threads on said jaws, said nut contact portion being configured with respect to the angularly disposed passageways in said body member so as not to interfere with the jaws positioned therein;

e) a sleeve member in driving engagement with said nut whereby when said sleeve member is rotated with respect to said body member, said jaws will be moved thereby; and f) wherein said nosepiece includes a sleeve contact portion, said sleeve contact portion being configured to prevent the sleeve from coming off the chuck.

10. A chuck for use with a manual or powered driver as stated in claim 1, and further including a bearing thrust ring on said body.

11. A chuck for use with a manual or powered driver as stated in claim 10, and further including a bearing assembly disposed adjacent said thrust ring.

12. A chuck for use with a manual or powered driver as stated in claim 11, wherein said bearing assembly is a self-contained anti-friction bearing.

13. A chuck for use with a manual or powered driver as stated in claim 9, wherein said nosepiece is press fitted on said body member.

14. A chuck for use with a manual or powered driver as stated in claim 9, wherein said nosepiece includes a substantially cylindrical portion and a frustoconical portion extending therefrom.

15. A chuck for use with a manual or powered driver as stated in claim 9, wherein said nosepiece is rust resistant.

16. A chuck for use with a manual or powered driver as stated in claim 9, and further including a second sleeve secured to said tail section of said body member.

17. A chuck for use with a manual or powered driver having a rotatable drive shaft, said chuck comprising;

a) a generally cylindrical body member having a nose section adapted to mate with said drive shaft of said driver and said nose section having an axial bore formed therein and a plurality of angularly disposed passageways formed therethrough and intersecting said axial bore;

b) a plurality of jaws slidably positioned in each of said angularly disposed passageways, each of said jaws having a jaw face formed on one side thereof and threads formed on the opposite side thereof;

c) a nut rotatably mounted with respect to said body member and in engagement with said threads on said jaws;

d) a nosepiece received on the nose section of said body, said nosepiece including a nut contact portion to assist in preventing said nut from disengaging the threads on said jaws, said nut contact portion being configured with respect to the angularly disposed passageways in said body member so as not to interfere with the jaws positioned therein, said nosepiece being configured as a one piece member with a cylindrical portion and a flared portion; and e) a sleeve member in driving engagement with said nut whereby when said sleeve member is rotated with respect to said body member, said jaws will be moved thereby.

18. A chuck for use with a manual or powered driver as stated in claim 17, and further including a bearing thrust ring on said body.

19. A chuck for use with a manual or powered driver as stated in claim 18, and further including a bearing assembly disposed adjacent said thrust ring.

20. A chuck for use with a manual or powered driver as stated in claim 19, wherein said bearing assembly is a self-contained anti-friction bearing.

21. A chuck for use with a manual or powered driver as stated in claim 17, wherein said nosepiece is press fitted on said body member.

22. A chuck for use with a manual or powered driver as stated in claim 17, wherein said nosepiece is rust resistant.

23. A chuck for use with a manual or powered driver as stated in claim 17, and further including a second sleeve secured to said tail section of said body member.

\* \* \* \* \*